Jan. 22, 1929.                                          1,699,585
W. H. EARLES
FOOD CHOPPER AND CUTTER
Filed Sept. 5, 1927         2 Sheets-Sheet 1
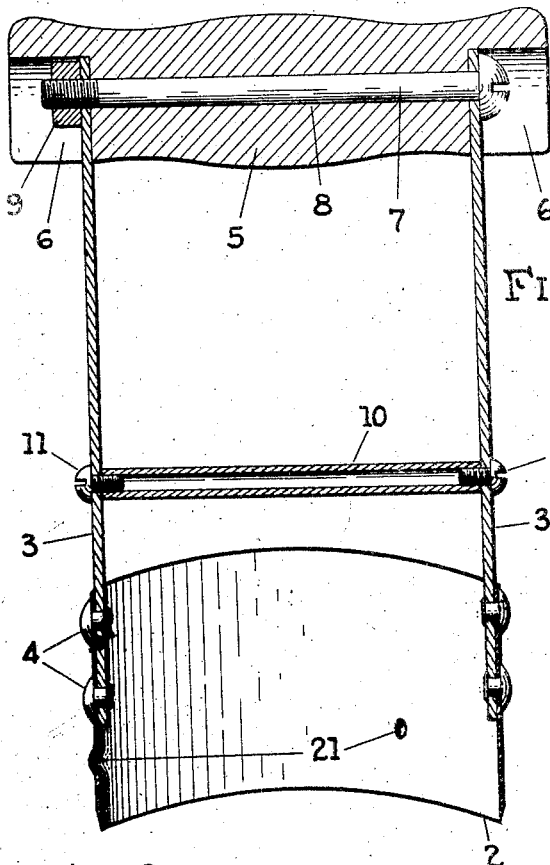
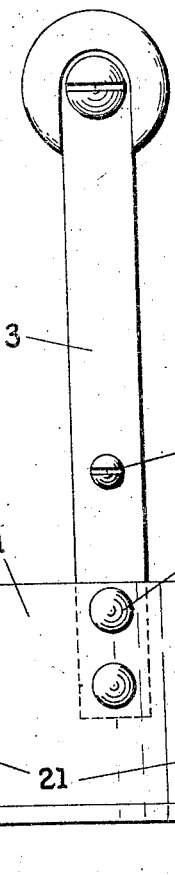
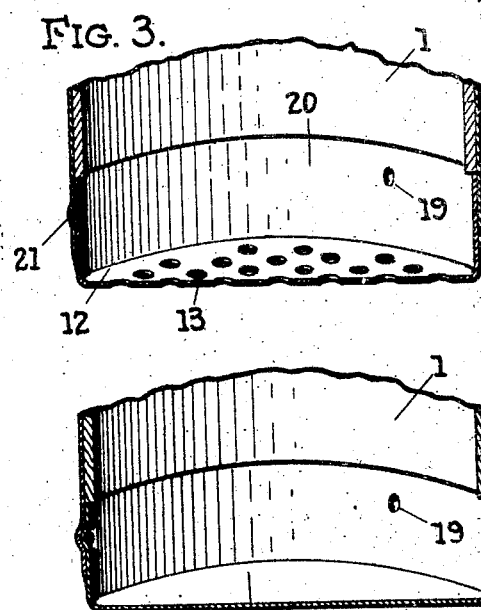
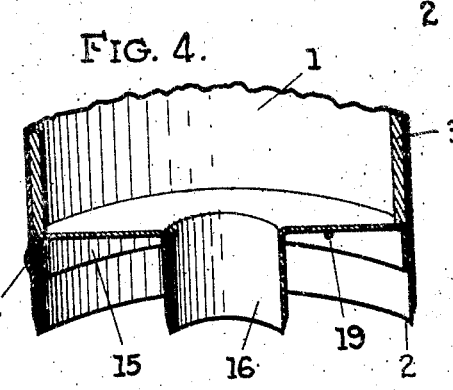
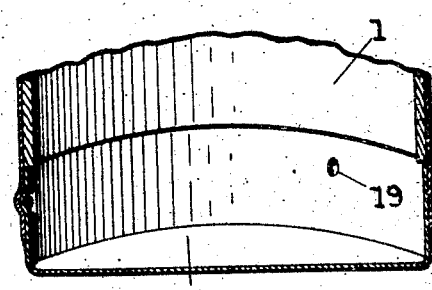
Inventor
WALTER H. EARLES Jan. 22, 1929.
W. H. EARLES
1,699,585
FOOD CHOPPER AND CUTTER
Filed Sept. 5, 1927  2 Sheets-Sheet 2
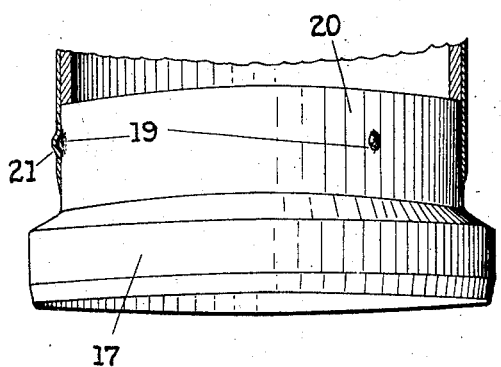
FIG. 6.
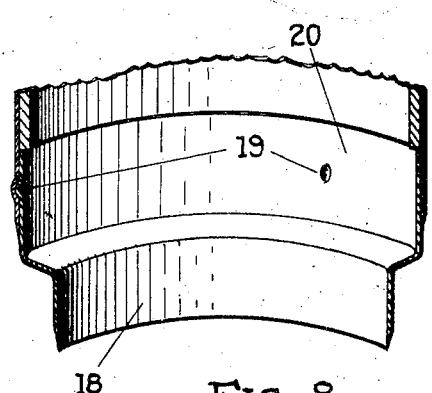
FIG. 8.
FIG. 7.
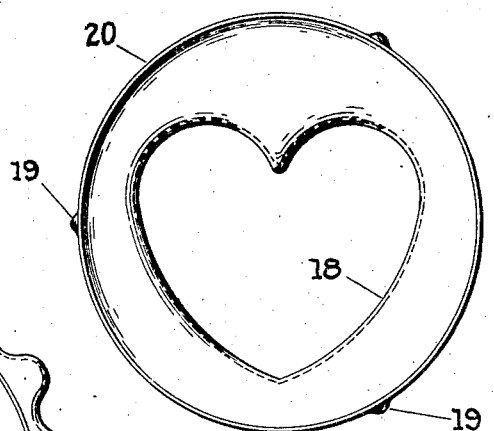
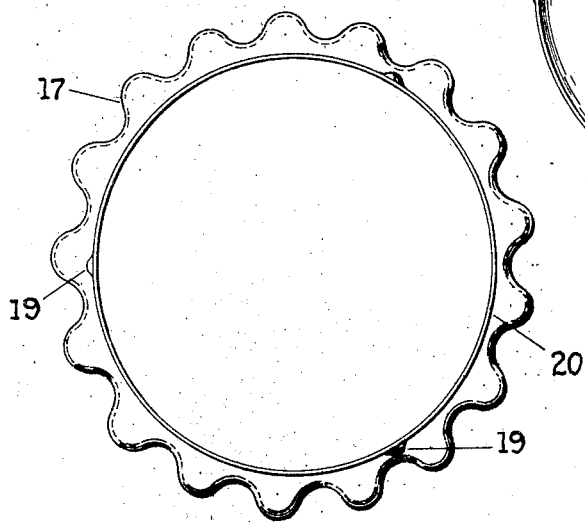
FIG. 9.
Inventor
WALTER H. EARLES
By Owen H. Spencer.
Attorney Patented Jan. 22, 1929.

1,699,585

UNITED STATES PATENT OFFICE.

WALTER H. EARLES, OF HUDSON, MICHIGAN.

FOOD CHOPPER AND CUTTER.

Application filed September 5, 1927. Serial No. 217,546.

This invention relates to food choppers and cutters and one feature of the invention is the provision of a body member to be used as a chopping element, the chopping portion also serving as a holder for various cutting elements.

A further feature of the invention is the provision of a handle member and associated means therewith for retaining the proper contour of the chopping element, and for strengthening and bracing the handle member.

A further feature of the invention is the provision of cutting elements having means thereon for fitting in and interlocking with the chopping element so that the same handle member may be used in either instance, said cutting elements being so constructed that articles of varying contours and sizes may be cut, according to the particular element selected by the user.

A further feature of the invention is the provision of elements adapted to be associated with the chopping element for performing various steps in the culinary art.

Other objects and advantages will be hereinafter more fully set forth and pointed out in the accompanying specification.

In the accompanying drawings, which are made a part of this application,

Figure 1 is a side elevation of the main chopping element.

Figure 2 is a sectional view thereof as seen on line 2—2, Fig. 1.

Figure 3 is a fragmentary perspective view showing the manner of attaching a colander-like member to the chopping element.

Figure 4 is a similar view showing a doughnut cutting element attached to the chopper, which cuts coordinately with the handle attached cutter.

Figure 5 is a similar view showing a potato or other food masher attached.

Figure 6 and Figure 7 is a perspective elevation and top plan view respectively, of a cake cutting element, and Figure 8 and Figure 9 are similar views of a different form of cutting element.

Referring to the drawings in which similar reference numerals designate corresponding parts thruout the several views, 1 indicates the body portion or chopping element of the device, which is preferably in the form of a circular band and having a sharpened edge 2 at its lower end. Attached to and extending upwardly from the body portion 1 is a pair of arms 3, the lower ends of which preferably extend interiorly of the body 1, rivets 4, or the like, being employed for attaching the arms to the body. At the upper end of the arms 3 is a handle section 5, constructed preferably of wood or fibre, the ends of the handle having recesses 6 in which the ends of the arms seat; a bolt 7 being passed thru a bore 8 in the handle and thru the ends of the arms 3; and a nut 9 being threaded onto said bolt for locking the arms and handle together.

In order to thoroughly reinforce and brace the arms 3 and at the same time retain the body 1 in a substantially perfect circle, a brace, in this instance in the form of a tubular sleeve 10, is extended between the arms 3 at a point between the body 1 and handle 5. Said sleeve serves to prevent the body 1 from collapsing or bulging out of shape at any point. Studs 11 are threaded thru the arms and into the ends of said sleeve for anchoring it in position.

The device, as shown in Fig. 1 and Fig. 2 serves as a cutter for cookies biscuits or the like, and at the same time as a food chopper for meat, vegetables such as slaw, or the like, or for other articles of similar nature. In the event, however, a colander arrangement is required, as shown in Fig. 3, an inverted cup shaped colander member 12 may be inserted into the circular body 1, until the top edge thereof strikes against the lower ends of the arms 3, thus limiting the upwarl movement of the member 12, by which arrangement downward thrust is imparted directly from said arms. The colander member 12 has perforations 13 in the bottom portion thereof thru which liquids may drain, or thru which food will emerge when said member is used as a masher. As shown in Fig. 5, a cup shaped member 14 with a solid bottom may be inserted in the body 1 and used for mashing potatoes or other edibles requiring mascerration. In Fig. 4, a circular member 15 is shown entered in the body 1, said member having a central cutting element 16 used for cutting the central opening in dough-nuts, the body 1 making the outside cut for the dough-nut, simultaneously. It is understood that the various members which are thus used, are inserted within the body 1 and against the lower ends of the arms 3, the operating thrusts of the user being exerted directly and rigidly against said members.

If desired, the cutting portions of the elements may be made larger or smaller than the diameter of the body 1, the cutting element 17 in Fig. 6 and Fig. 7 being enlarged and extended beyond the confines of the body 1, while the cutting element 18 is smaller than the diameter of the body 1. These cutting elements may have different configurations of any suitable design, as may appeal to the fancy of the manufacturer, such as illustrated in Fig. 9.

The cutting elements are held against casual release from the body 1 by providing bead-like protrusions 19 on the shank portions 20 of the various cutting elements, which snap into depressions 21 in the wall of the body portion 1, the walls of said shank portions being sufficiently yielding to permit the protrusions to be forced into or out of the body 1, when pressure is properly applied on the cutting elements, said protrusions snapping into the depressions when moved into registration therewith, and holding the cutting elements in fixed relation with the body portion until forcibly released therefrom.

With this form of device various things in the culinary art may be accomplished and the various elements provided at a minimum cost. It will likewise be seen that the various cutting elements may be quickly attached or removed from engagement with the primary chopping element.

While I have illustrated in a general way certain instrumentalities which may be employed in carrying my invention into effect, it is obvious that many modifications may be made in the various details, without departing from the scope of the appended claims.

I claim as my invention:

1. In a chopping and cutting device, a circular body portion having a lower cutting edge; arms fixed to said body portion; a handle connecting the upper ends of said arms; said body portion having depressions in the wall thereof; cutting elements adapted to be entered in said body portion, the lower ends of said arms engaging the upper edge of said cutting element when entered in said body portion for transmitting force directly to said cutting element; and protrusions on said cutting elements adapted to snap into said depressions for holding said cutting elements in fixed relation with said body portion.

2. In a chopping and cutting device, a circular body portion having a lower cutting edge; a pair of arms attached to said body portion and on the inner walls thereof; cutting implements adapted to be inserted into said body portion, the lower ends of said arms forming shoulders against which the implement abuts when entered in the body portion and by which means force is transmitted directly to said cutting implement; and interlocking means between said body portion and said implement for holding said implement in engagement with the body portion.

3. In a food chopping and cutting device, a circular body portion; a pair of arms having their lower ends entered in said body portion and secured thereto; a brace member between said arms for retaining said arms rigid and holding said body portion in true circular formation, said body portion having depressions therein; cutting implements having shanks adapted to enter said body portion; and protrusions on said shank portions adapted to snap into engagement with the said depressions, for holding the cutting elements in engagement with said body portion, the lower ends of said arms forming stops for said shanks, to receive the operating thrusts direct and by means of which force is transmitted directly to said cutting implement.

4. In a chopping and cutting device, a circular body portion; a pair of arms the lower ends of which extend a distance interiorly of the body portion; means for attaching the arms to the body portion; a handle connecting the outer ends of said arms; a brace member between said arms and attached thereto for maintaining true circular formation of the body portion; culinary implements adapted to be entered in said body portion; the lower ends of said arms engaging the top edges of said implements for transmitting force directly thereto; and interlocking means between said body portion and implements for holding the implements in engagement with the body portion.

In testimony whereof, I have hereunto set my hand on this the 2nd day of September, 1927, A. D.

WALTER H. EARLES.